United States Patent
Kim et al.

(10) Patent No.: US 8,446,663 B2
(45) Date of Patent: May 21, 2013

(54) ELECTRONIC PAPER DISPLAY DEVICE AND METHOD FOR MANUFACTURING THE SAME

(75) Inventors: Boum Seock Kim, Gyunggi-do (KR); Seung Gyo Jeong, Gyunggi-do (KR); Eun Tae Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 143 days.

(21) Appl. No.: 13/013,407

(22) Filed: Jan. 25, 2011

(65) Prior Publication Data
US 2012/0038969 A1 Feb. 16, 2012

(30) Foreign Application Priority Data
Aug. 13, 2010 (KR) .................. 10-2010-0078492

(51) Int. Cl.
*G02B 26/00* (2006.01)
*G09G 3/34* (2006.01)

(52) U.S. Cl.
USPC .......................... 359/296; 345/107

(58) Field of Classification Search
USPC .............. 359/296; 345/107; 430/32; 204/600
See application file for complete search history.

(56) References Cited

U.S. PATENT DOCUMENTS 7,342,556 B2 * 3/2008 Oue et al. .................. 345/33
2004/0119680 A1 6/2004 Daniel et al.

FOREIGN PATENT DOCUMENTS

| JP | 2001-084898 A | 3/2001 |
| JP | 2002-169189 | 6/2002 |
| JP | 2004-199057 | 7/2004 |
| KR | 10-2008-0094252 A | 10/2008 |

OTHER PUBLICATIONS

Korean Office Action, and English translation thereof, issued in Korean Patent Application No. 10-2010-0078492 dated Feb. 14, 2012.

* cited by examiner

*Primary Examiner* — William Choi
(74) *Attorney, Agent, or Firm* — McDermott Will & Emery LLP

(57) ABSTRACT

There are provided an electronic paper display device and a method for manufacturing the same. The electronic paper display device includes a first substrate having a first electrode made of transparent material and formed thereon; a second substrate arranged opposite to the first substrate with a predetermined space and having a second electrode formed thereon; a display element layer formed between the first substrate and the second substrate and having a plurality of display elements arranged thereon, the display elements having optical characteristics changed by voltage applied to the first and second electrodes; and vibration parts formed on the first substrate or the second substrate and configured to apply vibrations to the display elements by the voltage applied to the first and second electrodes.

10 Claims, 4 Drawing Sheets

ELECTRONIC PAPER DISPLAY DEVICE AND METHOD FOR MANUFACTURING THE SAME

CROSS-REFERENCE TO RELATED APPLICATIONS

This application claims the priority of Korean Patent Application No. 10-2010-0078492 filed on Aug. 13, 2010, in the Korean Intellectual Property Office, the disclosure of which is incorporated herein by reference.

BACKGROUND OF THE INVENTION

1. Field of the Invention

The present invention relates to an electronic paper display device and a method for manufacturing the same, and more particularly, to an electronic paper display device having excellent display performance and a lower driving voltage and a method for manufacturing the same.

2. Description of the Related Art

Great changes in ways of transmitting and sharing information are required today, in correspondence with a new paradigm that is required in the developing information society. To meet this challenge, the development of flexible electronic paper, which is also called e-paper, has been accelerated and has entered an initial stage of commercial development.

E-paper is much cheaper in terms of production cost than a conventional flat panel display. Since e-paper does not use a backlight to illuminate its pixels, and does not need to be recharged constantly, it can have superior energy efficiency, while running at very low energy. Moreover, e-paper is very clear, has wider viewing angles, and is capable of holding text and images indefinitely without electricity being applied thereto. Due to advantages such as those described above, e-paper may indeed have a variety of applications and have enormous market potential. Applications may include e-books that have a paper-like surface and are capable of displaying digital versions of books, e-paper magazines with moving illustrations, self-updating newspapers, reusable paper displays for mobile phones, disposable TV screens, electronic wallpaper and the like.

Technical approaches for realizing E-paper are roughly classified into 4 methods: a twist ball method for rotating spherical particles, each of which is composed of a upper hemisphere and a lower hemisphere having different colors and opposite polarities, an electrophoresis method for encapsulating a charged color particle mixed with oil within a microcapsule or a microcup and operating the charged particle to respond to the application of an electric field, a QR-LPD (Quick Response-Liquid Power Display) method using charged liquid powders and a cholesteric liquid crystal display method using the selective reflection characteristic of cholesteric crystals.

In the twist ball method, a cell is filled with a transparent medium, and twist balls having opposite charges and having different colors, for example, white and black, are arranged within the transparent medium. When voltage is applied to the twist balls, the twist balls are subjected to the polarity of applied charges, so that the twist balls are rotated according to the direction of voltage such that the charges having opposite polarities are directed toward the front surface thereof, thereby displaying white and black.

SUMMARY OF THE INVENTION

An aspect of the present invention provides an electronic paper display device having excellent display performance and low driving voltage and a method for manufacturing the same.

According to an aspect of the present invention, there is provided an electronic paper display device, including: a first substrate having a first electrode made of transparent material and formed thereon; a second substrate arranged opposite to the first substrate with a predetermined space and having a second electrode formed thereon; a display element layer formed between the first substrate and the second substrate and having a plurality of display elements arranged thereon, the display elements having optical characteristics changed by voltage applied to the first and second electrodes; and vibration parts formed on the first substrate or the second substrate and configured to apply vibrations to the display elements by the voltage applied to the first and second electrodes.

The electronic paper display device may further include a plurality of barrier ribs configured to divide a space between the first and second substrates to provide a plurality of cell spaces, wherein the display elements are arranged in the cell spaces.

The electronic paper display device may further include a plurality of barrier ribs configured to divide a space between the first and second substrates to provide a plurality of cell spaces, wherein the electronic paper display elements are arranged in the cell spaces and the vibration parts are formed within the barrier ribs.

The display elements may be rotating bodies having different colors and representing different charge characteristics.

The display elements may be microcapsules by which transparent fluid where two types of charged particles representing different charge characteristics are dispersed is encapsulated.

The display elements may be two types of charged particles representing different charge characteristics.

The vibration parts may be made of a piezoelectric ceramic.

According to another aspect of the present invention, there is provided a method for manufacturing an electronic paper display device, including: preparing a first substrate having a first electrode made of transparent material and formed thereon and a second substrate having a second electrode formed thereon; forming vibration parts on the first substrate or the second substrate; and forming a display element layer by arranging the first substrate and the second substrate to be opposite to each other with a predetermined interval and arranging display elements on the predetermined interval.

The method may further include forming a plurality of barrier ribs configured to divide a space between the first and second substrates to provide a plurality of cell spaces on the first substrate or the second substrate, wherein the display elements are arranged in the cell spaces.

The method may further include forming barrier ribs configured to divide a space between the first and second substrates to provide a plurality of cell spaces on the first substrate or the second substrate; and forming vibration parts on the barrier ribs, wherein the display elements are arranged in the cell spaces.

The forming of the barrier ribs is performed by an imprinting method, an injection molding method, a laser patterning method, or a photolithography process.

The vibration parts may be made of a piezoelectric ceramic.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
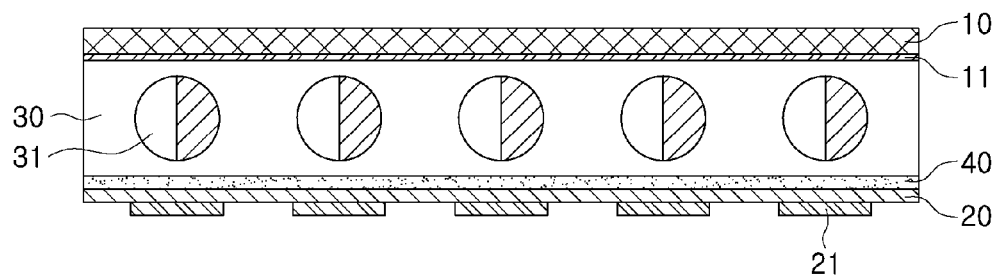
FIG. 1 is a cross-sectional view schematically showing an electronic paper display device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of elements may be exaggerated for clarity. Like reference numerals denote like elements throughout the specification.

FIG. 1 is a cross-sectional view schematically showing an electronic paper display device according to an embodiment of the present invention. Referring FIG. 1, the electronic paper display device according to the present embodiment includes a first substrate 10 and a second substrate 20 arranged to be opposite to each other with a predetermined interval, a display element layer 30 formed between the first substrate and the second substrate and having a plurality of display elements 31 arranged thereon, and a vibration part 40 applying vibrations to the display elements.

On the first substrate 10, a first electrode 11 made of a transparent material is formed. The location where the first electrode 11 is formed is not especially limited, and, as shown, may be formed on one surface of the first substrate directed toward the display element layer 30, the other surface of the first substrate or within the first substrate.

The first substrate 10 may be provided as a display surface, and thus may be made of a transparent material. According to the present invention, the light transmittance of the transparent material may be determined within a range determined such that visibility is not lowered, for example, light transmittance of 85% or more.

The first electrode 11 may use electrode material generally used in the related art as a conductive material. For example, a conductive polymer such as polythiophene or polyaniline, metal particles such as silver, nickel, a polymer film including the metal particles, or Indium-Tin-Oxide I (ITO) or the like may be used.

The first substrate 10 may be made of glass or flexible plastic material. The plastic may include, but is not limited to, for example, polyethylene terephthalate (PET), polycarbonate (PC), polymethylmethacrylate (PMMA), polyethylene naphthalate (PEN), polyethersulfone (PES), cyclic olefin copolymer (COC), polydimethylsiloxane (PDMS), poly urethane acrylate (PUA), or the like.

The second substrate 20 is arranged to be opposite to the first substrate 10 with a predetermined interval, and the second electrode 21 is formed thereon. The second substrate 20 and the second electrode 21 may be made of the same material as that of the first substrate and the first electrode.

The location where the first electrode 21 is formed is not especially limited, and as shown, may be formed on one surface of the first substrate directed opposite to the display element layer 30, the other surface of the second substrate or within the second substrate.

A plurality of rotating bodies 31 are arranged between the first substrate 10 and the second substrate 20. In the present embodiment, the display elements of the electronic paper display device are the rotating bodies 31.

In the present invention, the interval between the first and second substrates which the plurality of rotating bodies 31 are arranged is defined as the display element layer 30.

The rotating bodies 31 have electrical charges and are optically anisotropic, and the optical characteristics thereof may be changed due to voltage applied to the first electrode 11 and the second electrode 21.

Figure 2:
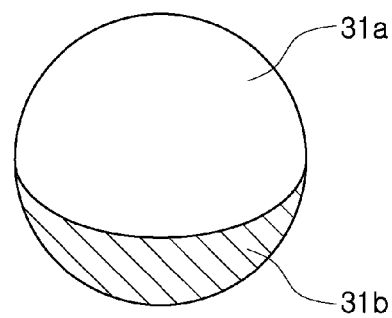
FIG. 2 is a cross-sectional view schematically showing an enlarged rotating body according to an exemplary embodiment of the present invention.

FIG. 2 is a cross-sectional view schematically showing an enlarged rotating body 31 according to an embodiment of the present invention. Referring to FIG. 2, the rotating body 31 has two display regions 31a and 31b which have different colors and represent different charge characteristics. The two display regions 31a and 31b may have different colors, and the first display region 31a may be white and the second display region 31b may be black. When the first display region 31a is charged with positive charges, the second display region 31b is charged with negative charges. When voltage is applied to the rotating body 31, the rotating body 31 is rotated depending on the magnitude and direction of the voltage and white or black is represented according to the colors colored on the two display regions.

As the method of forming the first and second display regions by electrically and optically processing the rotating body 31, methods well known in the related art may be used. For example, a method for inserting rotating bodies into a rotating disk including two colorants and then applying centrifugal force to the rotating bodies or the like may be used.

The shape of the rotating body 31 is not especially limited and for example, may include a spherical shape, an oval shape, a cylindrical shape or the like.

In the present embodiment, the case where the rotating body 31 has two display regions provided on the surface thereof is described, but the number of the display regions may be 3 or more, if required. Furthermore, the display regions may have various colors other than black or white.

The vibration part 40 is formed on the second substrate 20. The vibration part 40 generates vibrations by voltage applied to the first and second electrodes 11 and 21, and delivers the vibrations to the rotating bodies 31.

The vibration part 40 is not especially limited as long as it generates vibrations by voltage and, for example, may be made of a piezoelectric ceramic. The piezoelectric ceramic includes, yet is not limited to, for example, a composite piezoelectric material including PZT, such as PZT (Lead zirconate titanate, $Pb[Zr_xTi_{1-x}]O_3$ $0<x<1$) PMN-PNN-PZT ($Pb(Mg_{1/3}Nb_{2/3})_x(Ni_{1/3}Nb_{2/3})_yZrTiO_3$, or the like.

The location in which the vibration part 40 is formed is not especially limited as long as the location is a location to which the vibrations generated by the voltage applied to the first and second electrodes may be delivered, and the vibration part 40 may be formed on one surface of the second substrate directed toward the display element layer 30 as shown.

Alternatively, it may be formed between the second substrate 20 and the second electrode 21 or be formed to cover the second electrode. Alternatively, it may also be formed on the first substrate 10.

In the electronic paper display device according to the present embodiment, voltage is applied to the rotating bodies 31 by the first electrode 11 and the second electrode 21. The rotating bodies 31 are rotated depending on the direction of the applied voltage such that the charged states formed on the rotating bodies 31 are balanced. Therefore, the states of white and black are represented.

According to the present embodiment, when voltage is applied to the first and second electrodes 11 and 21, vibrations are generated in the vibration part 40. The vibrations generated in the vibration part are delivered to the rotating bodies, and the rotation of the rotating bodies is enhanced due to the vibrations. Accordingly, the rotation of the rotating bodies is possible at lower voltage. Furthermore, even in a case in which the rotating bodies have been balanced due to frictional force and therefore, do not respond to applied voltage, the movement of the rotating bodies can be activated by applying vibrations to the balanced state.

The reactivity of the rotating bodies is improved, thereby being driven at lower voltage and the balanced states are removed, thereby providing excellent display performance.

Although not shown, a control element for controlling the magnitude and direction of the voltage applied to the rotating bodies may be included in the first substrate 10 and the second substrate 20.

The display element layer 30 may be filled with dielectric liquid to facilitate the rotation of the rotating bodies.

Figure 3:
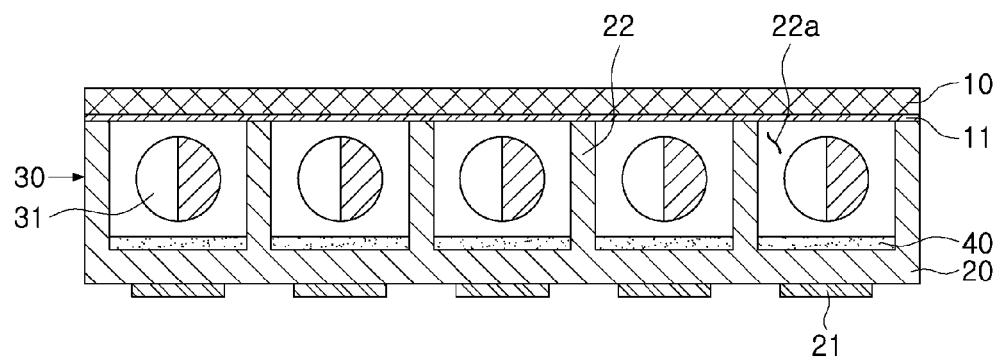
FIG. 3 is a cross-sectional view schematically showing an electronic paper display device according to another e exemplary embodiment of the present invention.

FIG. 3 is a cross-sectional view schematically showing an electronic paper display device according to another embodiment of the present invention. Components different from that of the above-described embodiment are mainly described below and details for the same components are omitted.

In the present embodiment, a plurality of barrier ribs 22 for dividing the space between the first substrate 10 and the second substrate and providing a plurality of cell spaces 22a may be formed on the display element layer 30. The rotating bodies 31 are arranged in the cell spaces 22a. As shown, one rotating body may be arranged in one cell space, but the present invention is not limited thereto, such that a plurality of rotating bodies may be arranged in one cell space.

The material of the barrier ribs 22 is not especially limited, as long as it is a flexible material and may include a thermosetting resin or a UV-setting resin, for example, polyethylene terephthalate (PET), polycarbonate (PC), polymethylmethacrylate (PMMA), polyethylene naphthalate (PEN), polyethersulfone (PES), cyclic olefin copolymer (COC), polydimethylsiloxane (PDMS), polyurethane acrylate (PUA), and the like.

The barrier ribs 22 are formed integrally with the second substrate 20, and may be a part of the second substrate 20. The barrier ribs 22 are formed integrally the first substrate 10, and may be a part of the first substrate 10.

The display element layer 31 may be filled with a dielectric liquid to facilitate the rotation of the rotating bodies 31.

In this embodiment, the vibration part 40 is formed on one surface of the second substrate 40 directed toward the display element layer 30 and is formed separately for each cell space. For driving characteristics, it is preferable that the vibration part 40 be formed for each cell space, but the vibration part 40 may be formed in selected cell spaces only.

Figure 4:
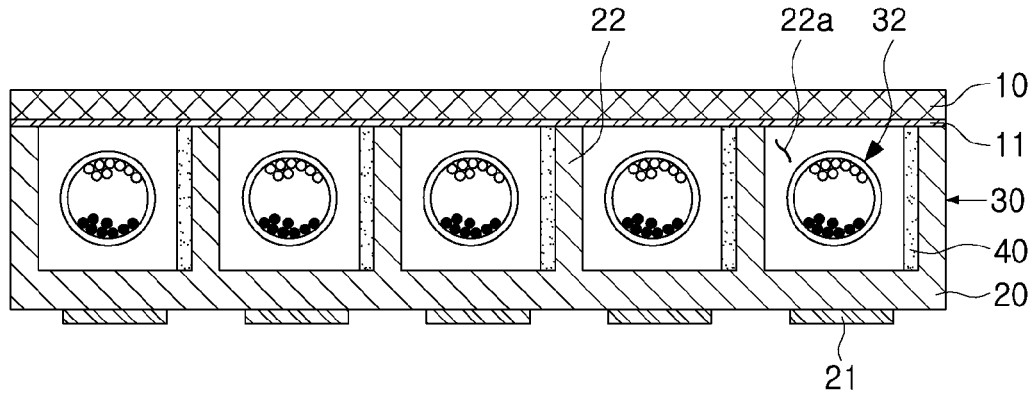
FIG. 4 is a cross-sectional view schematically showing an electronic paper display device according to another exemplary embodiment of the present invention.

FIG. 4 is a cross-sectional view schematically showing an electronic paper display device according to another embodiment of the present invention. Components different from those of the above-described embodiment are mainly described below and details for the same components are omitted.

In this embodiment, the display element arranged in the display element layer 30 is a microcapsule 32. Transparent fluid is encapsulated within the microcapsule 32, and two types of particles having different charge characteristics are dispersed in the transparent fluid.

Figure 5:
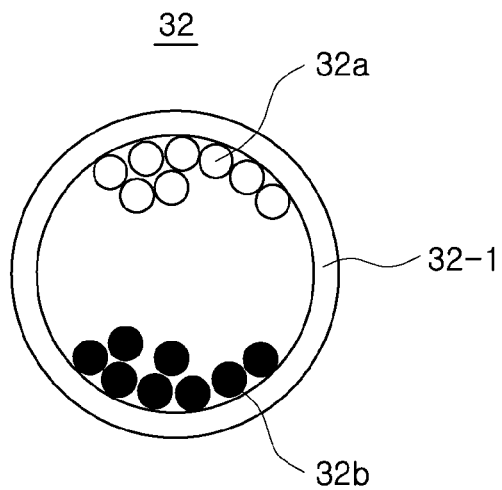
FIG. 5 is a cross-sectional view showing an enlarged microcapsule according to an exemplary embodiment of the present invention.

FIG. 5 is a cross-sectional view schematically showing an enlarged microcapsule according to an embodiment of the present invention. Referring to FIG. 5, the transparent fluid in which two types of charged particles 32a and 32b which have different charge characteristics and move due to an electrophoresis phenomenon are dispersed is encapsulated within the microcapsule 32 by the external wall 32-1 of the microcapsule. The charged particles dispersed within the transparent fluid may be white-colored particles 32a having positive charge or black-colored particles 32b having negative charge.

In addition, although not shown, the shape of the rotating body 32 is not especially limited and, for example, may have a spherical shape, an oval shape, a cylindrical shape or the like.

In this embodiment, the vibration part 40 is formed within the barrier rib 22, and is formed separately for each cell space. Furthermore, although not shown, the vibration part may be formed in two of the barrier ribs forming a cell space or, as shown in FIG. 3, may be also formed on one surface of the second substrate.

When voltage is applied to the microcapsules 32 by the first electrode 11 and the second electrode 21, the charged particles rise up or fall down, so that black or white is represented.

According to this embodiment, when voltage is applied to the first and second electrodes 11 and 21, the vibration part 40 delivers fine vibrations to the microcapsules 32 and thus the reactivity of the charged particles 32a and 32b included in the microcapsules 32 increases. Accordingly, the electronic paper display device can be driven at lower voltage and excellent display performance can be implemented by removing the balanced state.

Figure 6:
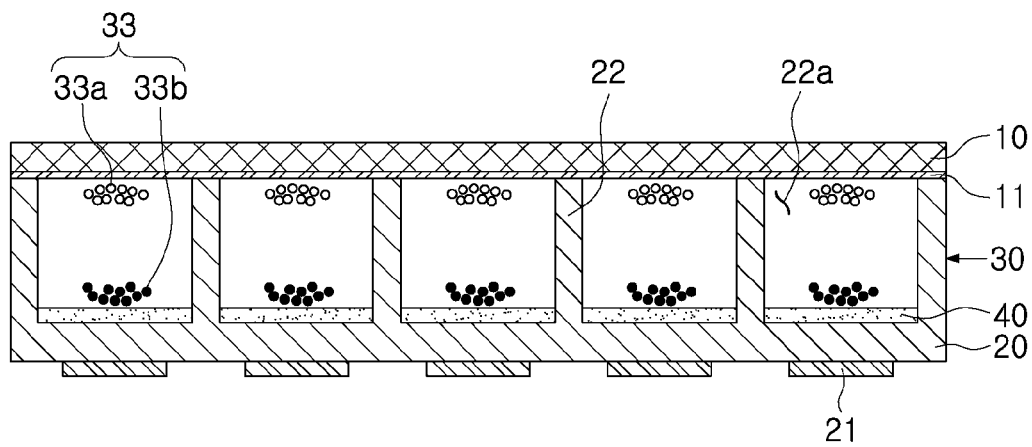
FIG. 6 is a cross-sectional view schematically showing an electronic paper display device according to another exemplary embodiment of the present invention.

FIG. 6 is a cross-sectional view schematically showing an electronic paper display device according to another embodiment of the present invention. Components different from that of the above-described embodiment are mainly described below and details for the same components are omitted.

In this embodiment, transparent fluid and two types of charged particles 33a and 33b having different charge characteristics dispersed in the transparent fluid are arranged in the display element layer 30.

The two types of charged particles different charge characteristics may be white-colored particles 33a having a positive charge or black-colored particles 33b having a negative charge.

When voltage is applied to the charged particles by the first electrode 11 and the second electrode 21, the charged particles rise up or fall down, so that black or white is represented.

According to this embodiment, when voltage is applied to the first and second electrodes 11 and 21, the vibration part 40 delivers fine vibrations to the charged particles 33a and 33b and thus the reactivity of the charged particles 33a and 33b increases. Accordingly, the electronic paper display device can be driven at lower voltage and excellent display performance can be implemented by removing the balanced state.

A method for manufacturing an electronic paper display device according to an embodiment of the present invention is described below. FIGS. 7A through 7D are cross-sectional views for respective processes illustrating a method for manufacturing the electronic paper display device according to an embodiment of the present invention.

Figure 7A:
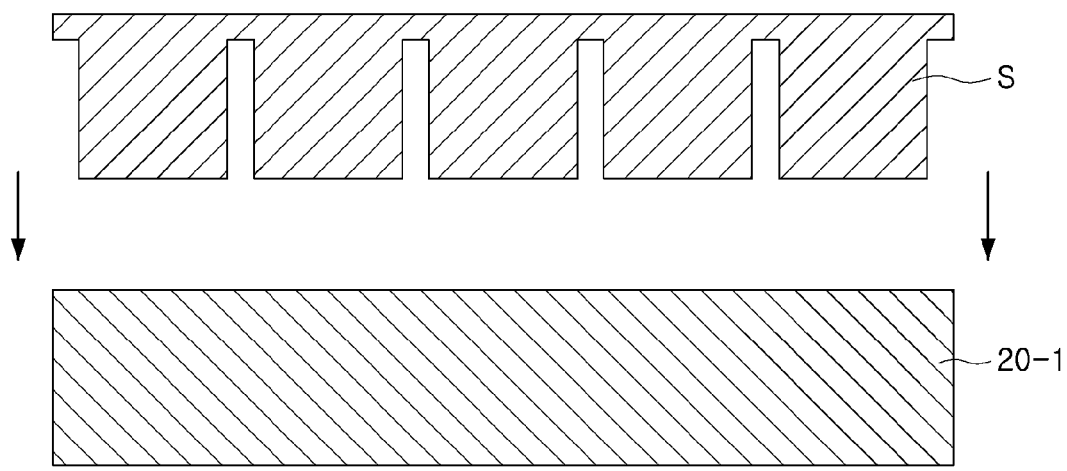
FIGS. 7A through 7D are cross-sectional views for respective processes illustrating a method for manufacturing the electronic paper display device according to an exemplary embodiment of the present invention.

First, as shown FIG. 7A, a preliminary structure 20-1 used as a second substrate is prepared.

Thereafter, the preliminary structure 20-1 is compressed with a stamp S having intaglio and relievo patterns.

Figure 7B:
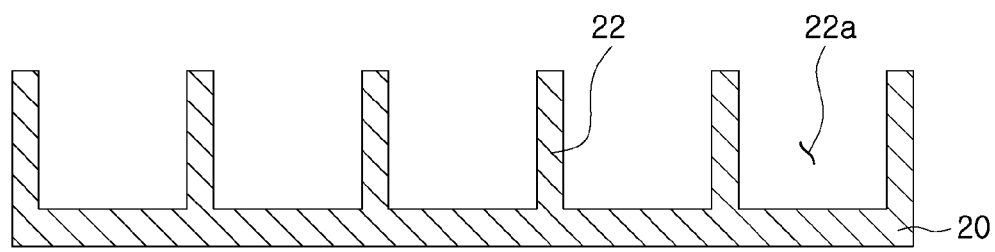

As shown in FIG. 7B, the second substrate 20 in which barrier ribs 22 for providing a number of cell spaces 22a are formed according to the intaglio and relievo patterns of the stamp. By controlling the intaglio and relievo patterns of the stamp S, the interval and size of the cell spaces may be adjusted.

Furthermore, a method for forming the second substrate 20 formed with the barrier ribs 22 includes, yet is not especially limited to, an injection molding method, a laser patterning method, a photolithography method or the like, in addition to the above-described imprint method.

The barrier ribs may be formed as a part of the second substrate as described above, or may be formed by forming a separate resin layer on the second substrate and then processing the resin layer using the above method.

Figure 7C:
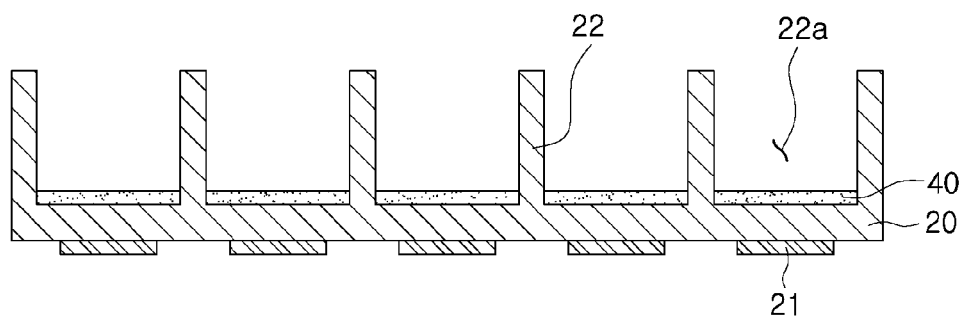

Subsequently, as shown in FIG. 7C, vibration parts 40 are formed on one surface of the second substrate provided as the cell spaces 22a and then second electrodes 21 are formed on the other surface of the second substrate.

The vibration parts 40 may be made of a piezoelectric ceramic or may be formed by printing a paste including a piezoelectric ceramic.

Alternatively, the piezoelectric ceramic may be formed by a manufacturing process, such as Chemical Vapor Deposition (CVD) or Physical Vapor Deposition (PVD).

The method of forming the second electrodes 21 includes, is not especially limited to, a plating process or a printing method using a conductive material.

Furthermore, although not shown, a process of forming the barrier ribs may be performed on a first substrate as described below. Alternatively, the first and second substrates may be provided without the process of forming the barrier ribs.

Figure 7D:
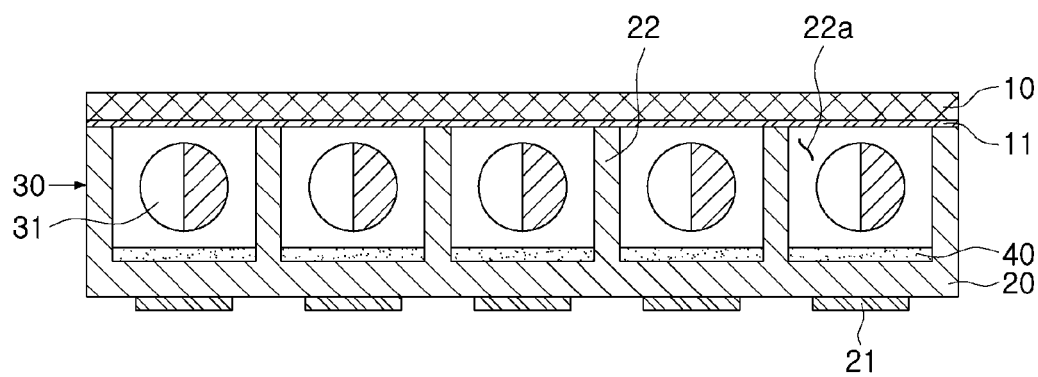

Next, as shown in FIG. 7D, display elements 31 are arranged in the number of cell spaces, thereby forming the display element layer 30. The display element 31 may be inserted into the cell space 22a by installing a filter on the second substrate 20 and using a squeegee, or the like.

Thereafter, the first substrate 10 is formed to be arranged opposite to the second substrate 20 and to cover the display elements 31.

A first electrode 11 may be formed on the first substrate 10 and a method for forming the first electrode 11 includes, yet is not especially limited to, a plating method and a printing method using a conductive material, or the like.

The cell spaces 22a may be filled with a dielectric liquid in order to facilitate the rotation of the display elements 31.

As described above, the display elements may be rotating bodies, microcapsules, or charged particles.

In this embodiment, the sequence of forming the first and second electrodes, forming the first and second substrates, and forming vibration parts is not especially limited, and may be appropriately determined according to the convenience of a process.

As set forth above, according to exemplary embodiments of the present invention when voltage is applied to the first and second electrodes, vibrations are generated in the vibration parts. The vibrations generated in the vibration part are delivered to the display elements, and the movement and rotation in the display elements are more activated due to the vibrations. Accordingly, the display elements can be moved and rotated at lower voltage.

Furthermore, even in the case in which the display elements have become balanced due to frictional force and therefore, do not respond to applied voltage, the movement of the display elements can be activated by applying vibrations in the balanced state.

According to the present invention, the reactivity of the display elements is improved, thereby being enable to be driven at lower voltage, and the balanced state is removed, thereby representing excellent display performance.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device, comprising:
a first substrate having a first electrode made of transparent material and formed thereon;
a second substrate arranged opposite to the first substrate with a predetermined space and having a second electrode formed thereon;
a display element layer formed between the first substrate and the second substrate and having a plurality of display elements arranged thereon, the display elements having optical characteristics changed by voltage applied to the first and second electrodes; and
vibration parts formed on the first substrate or the second substrate and for enhancing rotation of rotating bodies by applying vibrations to the display elements by the voltage applied to the first and second electrodes,
wherein vibration parts are made of piezoelectric ceramic including a composite piezoelectric material of PZT (Lead zirconate titanate, $Pb[Zr_xTi_{1-x}]O_3$ $0<x<1$) or PMN-PNN-PZT$(Pb(Mg_{1/3}Nb_{2/3})_x(Ni_{1/3}Nb_{2/3})_yZrTiO_3$.

2. The electronic paper display device of claim 1, further comprising a plurality of barrier ribs configured to divide a space between the first and second substrates to provide a plurality of cell spaces,
wherein the display elements are arranged in the cell spaces.

3. The electronic paper display device of claim 1, further comprising a plurality of barrier ribs configured to divide a space between the first and second substrates to provide a plurality of cell spaces,
wherein the electronic paper display elements are arranged in the cell spaces and the vibration parts are formed within the barrier ribs.

4. The electronic paper display device of claim 1, wherein the display elements are rotating bodies having different colors and representing different charge characteristics.

5. The electronic paper display device of claim 1, wherein the display elements are microcapsules by which transparent fluid where two types of charged particles representing different charge characteristics are dispersed is encapsulated.

6. The electronic paper display device of claim 1, wherein the display elements are two types of charged particles representing different charge characteristics.

7. A method for manufacturing an electronic paper display device, comprising:
preparing a first substrate having a first electrode made of transparent material and formed thereon and a second substrate having a second electrode formed thereon;
forming vibration parts on the first substrate or the second substrate; and
forming a display element layer by arranging the first substrate and the second substrate to be opposite to each other with a predetermined interval and arranging display elements on the predetermined interval,
wherein vibration parts enhance rotation of rotating bodies by applying vibrations to the display elements, and vibration parts are made of piezoelectric ceramic including a composite piezoelectric material of PZT (Lead zirconate titanate $Pb[Zr_xTi1-x]O_3$ $0<x<1$) or PMN-PNN-PZT($Pb(Mg_{1/3}Nb_{2/3})_x(Ni_{1/3}Nb_{2/3})yZrTiO_3$.

8. The method of claim 7, further comprising forming a plurality of barrier ribs configured to divide a space between the first and second substrates to provide a plurality of cell spaces on the first substrate or the second substrate,
wherein the display elements are arranged in the cell spaces.

9. The method of claim 8, wherein the forming of the barrier ribs is performed by an imprinting method, an injection molding method, a laser patterning method, or a photolithography process.

10. The method of claim 7, further comprising:
forming barrier ribs configured to divide a space between the first and second substrates to provide a plurality of cell spaces on the first substrate or the second substrate; and
forming vibration parts on the barrier ribs,
wherein the display elements are arranged in the cell spaces.

* * * * *